No. 638,800. Patented Dec. 12, 1899.
J. A. CRAWFORD.
SMOKE CONSUMER FOR FURNACES, &c.
(Application filed July 12, 1899.)

(No Model.) 3 Sheets—Sheet 1.

Witnesses:
M. E. Harrison
H. G. Mehring

Inventor,
John A. Crawford
By O. D. Levis
Att'y.

THE NORRIS PETERS CO., PHOTO-LITHO., WASHINGTON, D. C.

No. 638,800. Patented Dec. 12, 1899.
J. A. CRAWFORD.
SMOKE CONSUMER FOR FURNACES, &c.
(Application filed July 12, 1899.)

(No Model.) 3 Sheets—Sheet 2.

Witnesses: Inventor.
W. E. Harrison John A. Crawford
H. G. Mehring By O. D. Levis
Att'y.

No. 638,800. Patented Dec. 12, 1899.
J. A. CRAWFORD.
SMOKE CONSUMER FOR FURNACES, &c.
(Application filed July 12, 1899.)
(No Model.) 3 Sheets—Sheet 3.
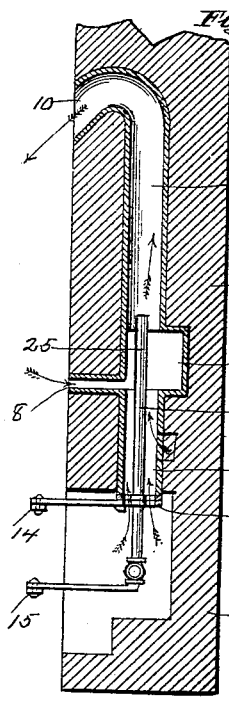
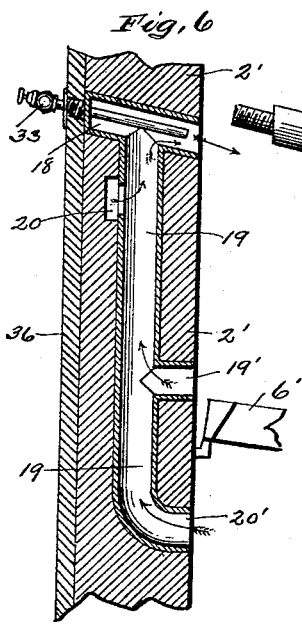
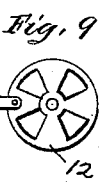
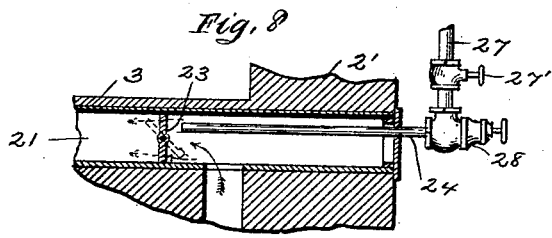
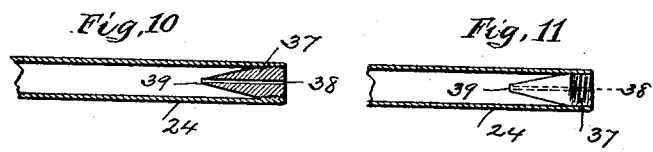
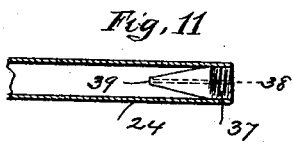
WITNESSES:
M. E. Harrison
H. G. Mehring
INVENTOR
John A. Crawford
BY
O. D. Levis
ATTORNEY.

UNITED STATES PATENT OFFICE.

JOHN A. CRAWFORD, OF ALLEGHENY, PENNSYLVANIA.

SMOKE-CONSUMER FOR FURNACES, &c.

SPECIFICATION forming part of Letters Patent No. 638,800, dated December 12, 1899.

Application filed July 12, 1899. Serial No. 723,598. (No model.)

*To all whom it may concern:*

Be it known that I, JOHN A. CRAWFORD, a citizen of the United States of America, residing at Allegheny, in the county of Allegheny and State of Pennsylvania, have invented certain new and useful Improvements in Smoke-Consumers for Furnaces, &c.; and I do hereby declare the following to be a full, clear, and exact description thereof, reference being had to the accompanying drawings, which form a part of this specification.

My invention relates to smoke-consumers for steam-boiler and other furnaces, and it is an improvement on Letters Patent granted to me bearing date of May 21, 1895, No. 539,768, and No. 586,477, dated July 13, 1897; and the object of the invention is to conduct partially-heated air from the ash-pit and more intensely heated air from a casing in the bridge-wall, said casing taking partially-heated air from the ash-pit and form counter-drafts to the smoke-stack, whereby by a proper manipulation of the steam jets, valves, and dampers regulating and controlling the currents of air to the fire-chamber the smoke will be entirely eliminated and a better and more intense combustion produced.

Another object of my invention is to provide a means for preventing the clogging of the pipes or flues from ashes and small particles of fuel drawn from the fire-chamber, and also to provide a steam-jet of peculiar construction for use upon this particular construction of smoke-consuming device that will not easily clog and when so clogged will easily be cleaned.

The invention finally consists in the certain details of construction and combination of parts, as will be fully described hereinafter.

Figure 1:
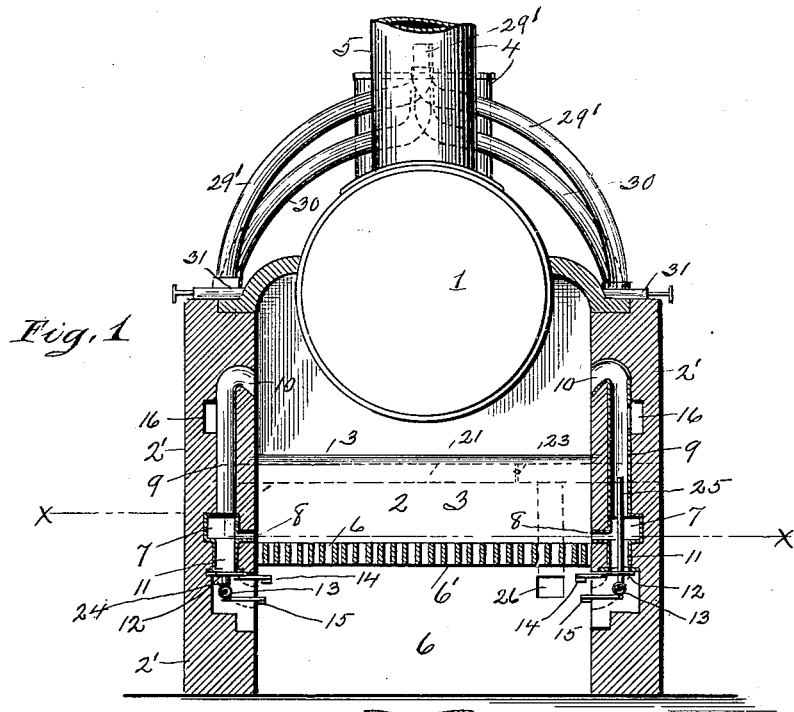
Figure 2:
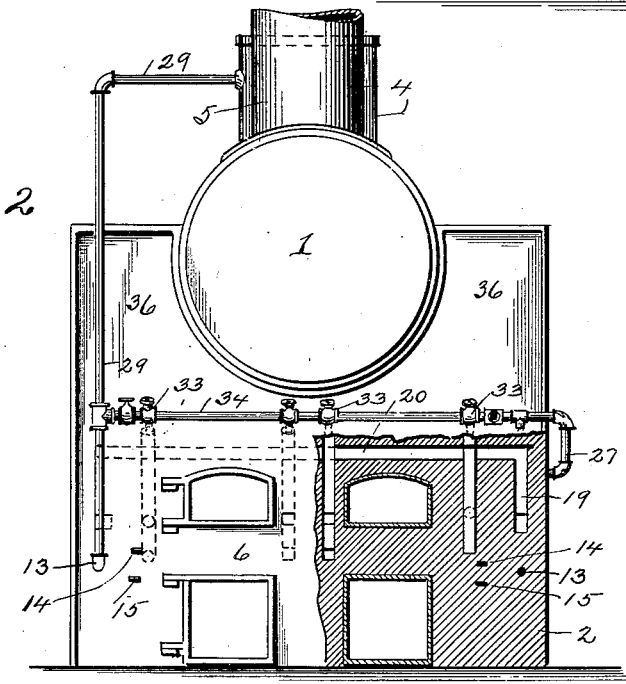
Figure 3:
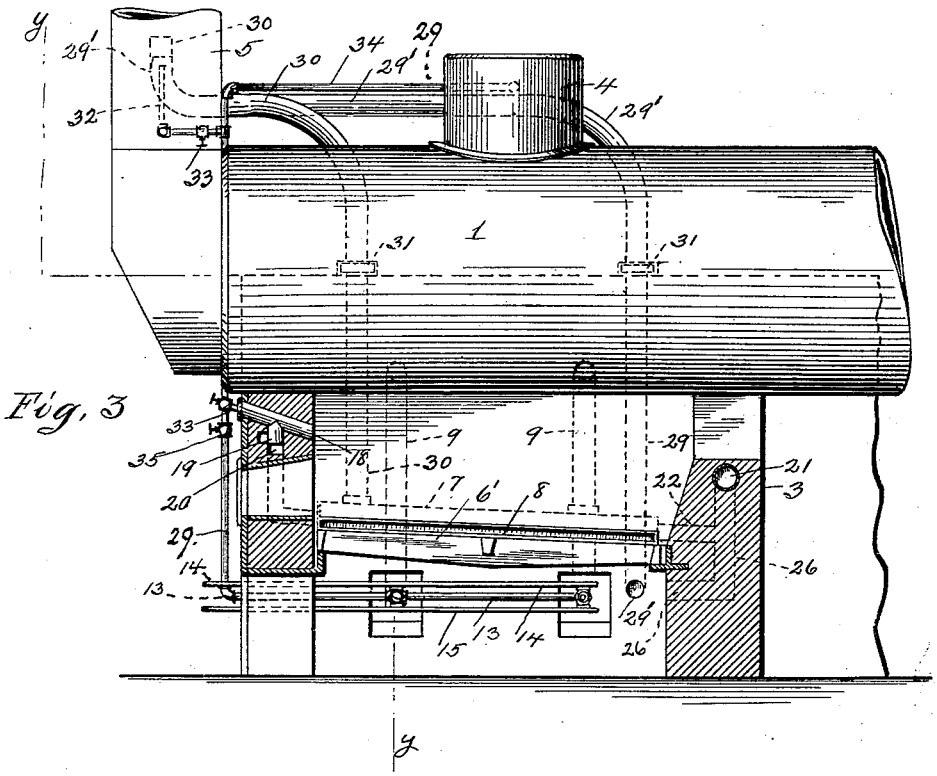
Figure 4:
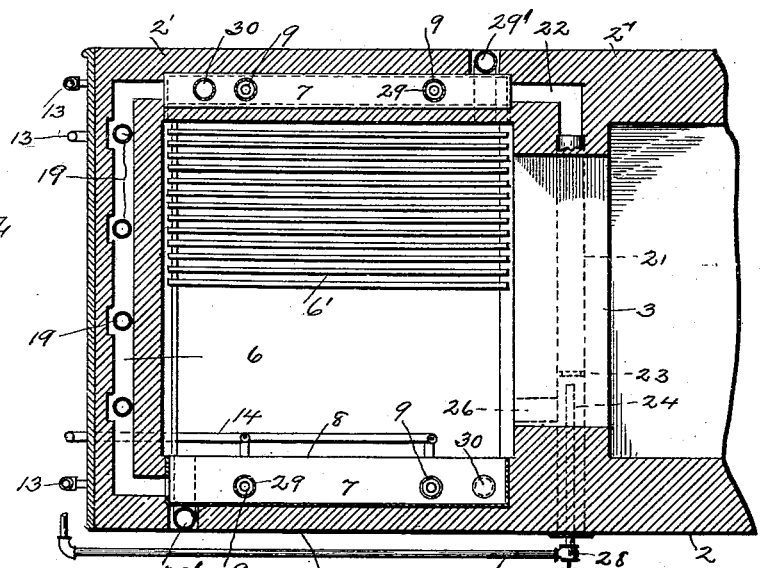

In the accompanying drawings, Figure 1 is a sectional front elevation of my improved smoke-consuming device, which is constructed and arranged in accordance with my invention, the said section being taken on the line $y\ y$ of Fig. 3. Fig. 2 is a front elevation of the same, partly in section. Fig. 3 is a longitudinal section vertically through the furnace, showing the arrangement of one of the gas and air pipes in the front wall, the slot 8 in the side wall, and the arrangement of the steam-feeding pipe to the jet-pipes. Fig. 4 is a sectional plan view taken on the line $x\ x$ of Fig. 1. Fig. 5 is an enlarged sectional elevation of one of the pipes arranged in the side wall of the furnace for conducting the air and gas to the point of combustion. Fig. 6 is a similar view of the pipes used in the front wall of the furnace. Fig. 7 is a detail of one of the short pipes used when an obstruction is met. Fig. 8 is an enlarged detail section through the bridge-wall, showing valve for controlling hot-air flues. Fig. 9 is a detail of the valve on bottom of pipe or air-flues. Fig. 10 is an enlarged sectional view of one of the steam-jets. Fig. 11 is a similar view showing the manner in which the jet is arranged within the tube.

To construct and arrange a smoke-consumer in connection with a boiler or other furnace in accordance with my invention, the said furnace, consisting of the boiler 1, the side walls 2', the bridge-wall 3, the fire-chamber beneath the boiler, the ash-pit 6, the usual metal casing 36, and grate-bars 6', and other well-known features not necessary to describe, I arrange at each side of the furnace or fire-chamber and upon the same plane as the grate-bars 6' two air-boxes, each of which consists of a box 7 of a length equal to that of the fire-chamber and having an opening 8 leading to the said chamber, the opening being in the form of a slot and extending the entire length of the grate-bars, and the said boxes provided with openings through the top, bottom, and ends for connections with hot and cold air pipes, hereinafter described.

Formed in the front wall of the fire-chamber is a flue 20, communicating with the front ends of the air-boxes 7, and the said flue having several hot-air pipes 19 leading therefrom, each of which is connected with an inclined connection 18, fitted with a steam-jet 33, and connected in multiple to a branch pipe 34, leading from a main supply-pipe 29, connected to the steam-dome 4 of the boiler 1. A valve 35 is placed in the pipe 29 to regulate the flow of steam to the jet-pipes. The pipes 19 are formed with an intake branch 19', opening from the fire-chamber above the grate-bars, through which the gases from the fire-chamber enter, and at the lower end of the pipes 19 is formed an air-intake branch 20', leading from the ash-pit. Each of these steam-jets is controlled by a valve and used to siphon a current of heated air from the box 7 and discharge the same at a point within the fire-chamber above the line of fuel. This air upon its passage gathers more or less heat from the walls in which the pipes 19 are embedded and from the flue 20 and box 7, as well as from the ash-pit beneath, and when discharged into the furnace will produce better combustion of the gases arising from the fuel in the form of smoke or waste products of combustion at this particular part of the fire-chamber.

Connected to the bottoms of the air-boxes 7 are a suitable number of short pipes or flues 11, leading to and in communication with the ash-pit 6, and are used for the purpose of drawing the partially-heated air from the said pit into the air-boxes 7. Each of these pipes 11 is provided at its base with a valve or damper 12 (see Figs. 5 and 9) to regulate the currents of air entering the same, and the said dampers connected by bars 14 at each side of the ash-pit, by means of which each set of dampers may be opened or closed by the operator at the front of the furnace. Each of these short pipes 11 is fitted with a steam-jet 24, consisting of (see Figs. 8 to 10 and 11) a short piece of tubing 24, having attached in its forward end by means of a screw-thread a tapering plug 37, provided with a small central channel 38, the jet 39 of which is within the tube 24, leaving an annular space about the said jet to gather the particles of dust or dirt. These jets 24 used with the short pipes 11 are provided with valves which are connected in multiple to bars 15, projecting through the front of the furnace, and are used to admit or shut off steam to the jets and the said jets used to siphon heated air from the ash-pit and discharge the same into vertically-arranged hot-air pipes 9, connected to the top of the air-boxes 7, the jet-pipes being coupled at their bases by the pipe 13, which is a continuation of the pipe 29. These hot-air pipes 9 (see Fig. 5) are arranged and connected to the air-boxes 7 at either side of the furnace and lead to and discharge at a point above the line of fuel, at which place the currents of heated air and gases are deflected downward by bent exits 10, where the said superheated air and gases mingle with the smoke and gases arising from the fire will cause instantaneous combustion, consuming the smoke and further aiding the combustion of the fuel. In the side walls is formed an air passage or channel 16, adjacent to the upper ends of the hot-air pipes and opening therein through a slot or opening, as shown, the channel 16 being a continuation of the channel 20 in the front of the furnace and serves the same purpose.

Arranged within the bridge-wall 3 and in communication with the rear end of one of the air-boxes 7 and with the ash-pit 6, by means of flues 22 and 26, is a pipe 21, fitted with a damper 23 and steam-jet 24, regulated by a valve 28 and connected with the steam-pipe 34 by a branch 27. This pipe 21 siphons air from the ash-pit 6 and delivers the same at a high temperature to the air-box 7 and is there withdrawn and discharged into the furnace by means of the hot-air pipes 9, above described.

The hot-air pipes 9, by means of their steam-jets 24, will draw the smoke and products of combustion through the slots 8 into the boxes 7 and in their passage upward be superheated when discharged into the fire-chamber and instantly consumed.

To control and regulate the various currents of heated air and gases discharged into the fire-chamber by the pipes and flues, previously described, and to retard the draft to prevent too rapid combustion of the fuel and also to burn any unconsumed smoke and gases that may have escaped to the draft-stack 5 by improper manipulation of the various dampers and valves of the apparatus, two sets of hot and cold air pipes 29' and 30 are arranged at each side of the furnace, the one of each set leading from the ash-pit 6 and the other from the air-box 7 and both sets entering the draft-stack 5 at a point above the boiler 1. Each of the cold-air pipes 29' terminates in the draft-stack 5 at a point some distance below the hot-air pipes 30, and each of the said pipes fitted with a damper 31 to open and close the passages of the same.

By means of the pipe 29', leading from the ash-pit 6, a counter-draft is created which tends to draw the smoke downward through the grate-bars, thereby retarding the fire by forming a draft to the stack 5. The pipes 30, leading from the air-boxes 7, are used to supply heated air and gases to ignite and consume any smoke found within the draft-stack 5, which is often the case when the currents of superheated air supplied to the fire-chamber are not properly regulated or when a surplus of green fuel is thrown upon the fire.

Good results may be obtained from the cold-air pipe 29 when the inlet-openings are located outside of the furnace, as a direct draft may be formed to retard the fire, as is obvious.

By using the various currents of superheated air and gases, either separately or the one current with the other, until the proper degree of temperature is obtained perfect combustion of the smoke and fuel is secured.

Each of the hot and cold air pipes 29' or 30 may be fitted with a steam-jet, if so desired, and other slight modifications and changes made without departing from the spirit of the invention.

Having thus described my invention, what I claim, and desire to secure by Letters Patent, is—

1. In combination with a steam-boiler or other furnace, the hot-air boxes 7, arranged within the side walls of the furnace and at each side thereof, a slot or opening formed in the said boxes communicating with the interior of the fire-chamber upon the same plane as the grate-bars, suitable hot-air flues leading from the said boxes and discharging into the fire-chamber above the line of fuel, steam-jets entering the said hot-air pipes and terminating above the air-boxes, and valves for regulating the amount of air entering the hot-air pipes, as described.

2. In combination with a steam-boiler or other furnace, the hot-air boxes provided with slots extending along the entire length of the fire-chamber and upon the same plane as the grate-bars, in combination with a hot-air pipe 30 leading from the said box and terminating within the draft-stack above the boiler, as and for the purpose described.

3. In combination with a steam-boiler or other furnace, the hot-air box 7 provided with a slot extending along the entire length of the fire-chamber, and upon the same plane as the grate-bars, a series of hot-air pipes provided with dampers, and leading from the ash-pit, a series of siphon pipes or flues arranged in the front wall of the furnace, communicating with the ash-pit and with the ends of the air-boxes, whereby superheated air and gases are discharged into the furnace above the line of the fuel, as and for the purpose described.

4. In combination with a smoke-consuming device such as described, the hot and cold air pipes leading to the draft-stack, the cold air having an entrance to the ash-pit, and the hot-air pipe communicating with the interior of the fire-chamber, suitable steam-jets arranged in the said pipes for creating a forced draft, whereby the smoke and products of combustion may be drawn downward through the fire, substantially as described.

In testimony whereof I have hereunto affixed my signature in the presence of two subscribing witnesses.

JOHN A. CRAWFORD.

Witnesses:
H. G. MEHRING,
M. E. HARRISON.